US010055437B2

(12) United States Patent
Ma et al.

(10) Patent No.: US 10,055,437 B2
(45) Date of Patent: Aug. 21, 2018

(54) METHOD AND APPARATUS FOR QUERYING DATA IN DATABASE

(71) Applicant: Huawei Technologies Co., Ltd., Shenzhen (CN)

(72) Inventors: Qingli Ma, Shenzhen (CN); Zhibiao Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 400 days.

(21) Appl. No.: 14/665,937

(22) Filed: Mar. 23, 2015

(65) Prior Publication Data

US 2015/0269205 A1  Sep. 24, 2015

(30) Foreign Application Priority Data

Mar. 21, 2014 (CN) .......................... 2014 1 0109559

(51) Int. Cl.
*G06F 17/30* (2006.01)
*G06F 17/00* (2006.01)

(52) U.S. Cl.
CPC .. *G06F 17/30324* (2013.01); *G06F 17/30306* (2013.01); *G06F 17/30581* (2013.01); *G06F 17/30867* (2013.01)

(58) Field of Classification Search
CPC .......... G06F 3/14; G06F 3/1438; G06F 9/505; G06F 9/5072; G06F 2209/501;

(Continued)

(56) References Cited

U.S. PATENT DOCUMENTS 7,783,688 B2 * 8/2010 Huber ................... H04L 63/145
707/698
9,032,405 B2 * 5/2015 Gerber .................. G06F 9/5066
718/100

(Continued)

FOREIGN PATENT DOCUMENTS

| CN | 101008573 A | 8/2007 |
| CN | 102231155 A | 11/2011 |
| WO | WO 2012142186 A2 | 10/2012 |

OTHER PUBLICATIONS

Kim et al. A Performance Study of Traversing Spatial Indexing Structures in Parallel on GPU High Performance Computing and Communication & 2012 IEEE 9th International Conference on Embedded Software and Systems (HPCC-ICESS), 2012 IEEE 14th International Conference on.*

(Continued)

*Primary Examiner* — Yicun Wu
(74) *Attorney, Agent, or Firm* — Leydig, Voit & Mayer, Ltd.

(57) ABSTRACT

A method and an apparatus for querying data in a database, and the method includes: receiving a query instruction; determining a status of each block index in a block index set prestored in a global memory of a GPU; when each block index in the global memory of the GPU is in an asynchronous state, starting one or more GPU processes to filter the block index in the global memory of the GPU according to a query condition, to obtain a first block index query result; and determining a final data query result according to the first block index query result. In this method, querying is performed by directly using a GPU process, thereby omitting a process of repeatedly copying partitioned data from a memory in the prior art, shortening query time, and improving query efficiency.

14 Claims, 10 Drawing Sheets

(58) Field of Classification Search
CPC ............... G06F 9/5044; G06F 13/14; G06F 2009/4557; G06F 17/30445; G06F 17/30498; G06F 9/44; G06F 8/41; G06F 17/30519; G06F 9/45533; G06F 9/45558; G06F 9/5016; G06F 9/5027; G06F 11/34; G06F 11/3409; G06F 11/36; G06F 11/3684; G06F 9/4411; G06F 11/3688; G06F 12/0862; G06F 15/8023; G06F 17/30442; G06F 17/5009; G06F 19/3437; G06F 1/3206; G06F 1/324; G06F 1/325; G06F 1/3265; G06F 9/455; G06F 2209/5011; G06F 2209/5013; G06F 2209/509; G06F 2209/544; G06F 2212/302; G06F 2212/6024; G06F 2212/6028; G06F 2217/16; G06F 3/162
See application file for complete search history.

(56) References Cited

U.S. PATENT DOCUMENTS

| | | | |
|---|---|---|---|
| 9,330,129 B2* | 5/2016 | Vemuri, Sr. | ....... G06F 17/30333 |
| 2003/0195869 A1* | 10/2003 | Bhattacharjee | ... G06F 17/30321 |
| 2007/0288433 A1 | 12/2007 | Gupta et al. | |
| 2008/0243811 A1* | 10/2008 | He | ................. G06F 17/30616 |
| 2008/0320214 A1* | 12/2008 | Ma | ..................... G06F 3/0613 |
| | | | 711/103 |
| 2010/0312995 A1* | 12/2010 | Sung | ..................... H04L 67/38 |
| | | | 712/220 |
| 2011/0264626 A1 | 10/2011 | Gautam et al. | |
| 2015/0052134 A1* | 2/2015 | Bornea | ............ G06F 17/30598 |
| | | | 707/737 |
| 2015/0370838 A1* | 12/2015 | Paradies | .......... G06F 17/30958 |
| | | | 707/738 |

OTHER PUBLICATIONS

Fast Parallel Interpolation Algorithm Using Cuda Yanwei Zhao1,2,3, Qiang Qiu1,2, Jinyun Fang1, Liang Li3 Geoscience and Remote Sensing Symposium (IGARSS), 2013 IEEE International.*
Bress et al., "Why it is Time for a HyPE: A Hybrid Query Processing Engine for Efficient GPU Coprocessing in DBMS," Proceedings of the VLDB Endowment, pp. 1398-1403, vol. 6, Issue 12, Trento, Italy (Aug. 26-30, 2013).
Govindaraju et al., "Fast Computation of Database Operations Using Graphics Processors," Proceedings of the 2004 ACM SIGMOD International Conference on Management of Data, pp. 215-226, Association for Computing Machinery, New York, New York (Jun. 13, 2004).

* cited by examiner

METHOD AND APPARATUS FOR QUERYING DATA IN DATABASE

CROSS-REFERENCE TO RELATED APPLICATION

This application claims priority to Chinese Patent Application No. 201410109559.8, filed on Mar. 21, 2014, which is hereby incorporated by reference in its entirety.

TECHNICAL FIELD

The present invention relates to the field of database technologies, and in particular, to a method and an apparatus for querying data in a database.

BACKGROUND

To accelerate data processing, a multi-process/multi-thread concurrency technology is usually used in an analytical database. Even though the number of CPU cores becomes larger, an increase speed of the number of the CPU cores cannot meet a data processing requirement. A common graphics processing unit (Graphics Processing Unit, GPU for short) provides a stronger concurrent processing capability and a larger memory bandwidth, which is applicable to a computing application with high concurrency, intensive computing, and simple control.

In the prior art, in a process of executing a data query instruction by using a GPU, because a size of a Global Memory (global memory, also referred to as a video memory) of the GPU is limited, after a GPU thread is started for each short query, partitioned data corresponding to a query condition needs to be imported into the global memory of the GPU; when there are multiple query conditions, the process is repeated for multiple times; therefore, a query process is very complicated; in addition, a delay for copying data from a memory to the global memory of the GPU is relatively long, thereby greatly lowering efficiency of executing the query instruction by using the GPU.

SUMMARY

In view of this, embodiments of the present invention provide a method and an apparatus for querying data in a database, and an objective is to accelerate data filtering in a data query process by using a strong concurrent processing capability of a GPU, reduce a large amount of data copying between the GPU and a memory, and improve data query efficiency.

To achieve the foregoing objective, the embodiments of the present invention provide the following technical solutions:

According to a first aspect, an embodiment of the present invention provides a method for querying data in a database, where the database runs in a computer system including a central processing unit CPU and a graphics processing unit GPU, and the method includes:

receiving a query instruction, where the query instruction includes one or more query conditions;

determining a status of each block index in a block index set prestored in a global memory of the GPU, where the block index set includes at least one block index, and the block index set is generated by the CPU according to original data in the database and is stored into the global memory of the GPU; and when each block index in the global memory of the GPU is in an asynchronous state, starting one or more GPU processes to filter the block index in the global memory of the GPU according to the one or more query conditions, to obtain a first block index query result; and determining a final data query result according to the first block index query result.

In a first possible implementation manner of the first aspect, a memory of the computer system stores the block index set generated according to the original data in the database by the CPU, and the method further includes:

when the block index set in the global memory of the GPU includes a block index in a synchronous state, filtering, according to the query condition, a block index that is in the block index set stored in the memory and corresponds to the block index in the synchronous state in the global memory of the GPU, to obtain a second block index query result;

starting one or more GPU processes to filter a block index in an asynchronous state in the global memory of the GPU according to the query condition, to obtain a third block index query result; and determining a final data query result according to the second block index query result and the third block index query result.

With reference to the first aspect or the first possible implementation manner of the first aspect, in a second possible implementation manner of the first aspect, before the determining a status of each block index in a block index set in a global memory of the GPU, the method further includes:

dividing, into multiple logical pages, the block index set generated according to the original data in the database by the CPU; and copying the multiple logical pages and continuously storing the multiple logical pages into the global memory of the GPU.

With reference to the first possible implementation manner of the first aspect, in a third possible implementation manner of the first aspect, the method further includes:

after the original data in the database is updated, updating the block index set stored in the memory; and generating a block index update bitmap corresponding to an updated block index set, and marking an updated block index in the block index update bitmap.

With reference to the third possible implementation manner of the first aspect, in a fourth possible implementation manner of the first aspect, the method further includes: determining, according to an marked block index update bitmap, a block index that is in the block index set stored in the global memory of the GPU and needs to be updated, and updating the block index that needs to be updated.

With reference to the first aspect, in a fifth possible implementation manner of the first aspect, the starting one or more GPU processes to filter the block index in the global memory of the GPU according to the query condition, to obtain a first block index query result includes:

allocating one or more GPU processes for each query condition; and starting the one or more GPU processes corresponding to each query condition to filter the block index in the global memory of the GPU, to obtain the first block index query result meeting the query condition, where the obtaining the first block index query result meeting the query condition includes:

copying, from the global memory of the GPU, a running result of the GPU process corresponding to each query condition, where the running result includes a result obtained after the GPU process corresponding to each query condition filters the block index in the global memory of the GPU to obtain a block index filter array corresponding to each query condition, and a logical operation is performed on the block index filter array according to a logical relationship between the query conditions.

With reference to the fifth possible implementation manner of the first aspect, in a sixth possible implementation manner of the first aspect, the determining a final data query result according to the first block index query result includes:

performing a logical operation on the first block index query result and a block index set in a memory of the computer system, to obtain a first final block index query result;

filtering the original data in the database by using the first final block index query result; and obtaining the final data query result by performing querying, according to the query condition, in original data obtained after the filtering.

With reference to the first possible implementation manner of the first aspect, in a seventh possible implementation manner of the first aspect, the starting one or more GPU processes to filter a block index in an asynchronous state in the global memory of the GPU according to the query condition, to obtain a third block index query result includes:

allocating one or more GPU processes for each query condition; and starting the one or more GPU processes corresponding to each query condition to filter the block index in the asynchronous state in the global memory of the GPU, so as to obtain the third block index query result meeting the query condition, where the obtaining the third block index query result meeting the query condition includes:

copying, from the global memory of the GPU, a running result of the GPU process corresponding to each query condition, where the running result includes a result obtained after the GPU process corresponding to each query condition filters the block index in the asynchronous state in the global memory of the GPU to obtain a block index filter array corresponding to each query condition, and a logical operation is performed on the block index filter array according to a logical relationship between the query conditions.

With reference to the seventh possible implementation manner of the first aspect, in an eighth possible implementation manner of the first aspect, the determining a final data query result according to the second block index query result and the third block index query result includes:

performing a logical operation on the third block index query result and the block index set in the memory of the computer system, to obtain a third final block index query result;

performing a logical operation on the second block index query result and the third final block index query result to obtain a second final block index query result;

filtering the original data in the database by using the second final block index query result; and obtaining the final data query result by performing querying, according to the query condition, in original data obtained after the filtering.

According to a second aspect, an embodiment of the present invention provides an apparatus for querying data in a database, where the database runs in a computer system including a central processing unit CPU and a graphics processing unit GPU, and the apparatus for querying data includes:

a query instruction receiving module, configured to receive a query instruction, where the query instruction includes one or more query conditions;

a status determining module, configured to determine a status of each block index in a block index set prestored in a global memory of the GPU, where the block index set includes at least one block index, and the block index set is generated by the CPU according to original data in the database and is stored into the global memory of the GPU;

a first filtering module, configured to: when a block index in the global memory of the GPU is in an asynchronous state, start one or more GPU processes to filter the block index in the global memory of the GPU according to the one or more query conditions, to obtain a first block index query result; and a first result determining module, configured to determine a final data query result according to the first block index query result.

In a first possible implementation manner of the second aspect, a memory of the computer system stores the block index set generated according to the original data in the database by the CPU, and the apparatus for querying data further includes:

a second filtering module, configured to: when the to-be-queried block index includes a block index in a synchronous state, filter, according to the query condition, a block index that is in the block index set stored in the memory and corresponds to the block index in the synchronous state in the global memory of the GPU, to obtain a second block index query result;

a third filtering module, configured to start one or more GPU processes to filter a block index in an asynchronous state in the global memory of the GPU according to the query condition, to obtain a third block index query result; and a second result determining module, configured to determine a final data query result according to the second block index query result and the third block index query result.

With reference to the first possible implementation manner of the second aspect, in a second possible implementation manner of the second aspect, the apparatus for querying data further includes:

an update module, configured to: after the original data in the database is updated, update the block index set stored in the memory; and a bitmap generating module, configured to generate a block index update bitmap corresponding to an updated block index set, and mark an updated block index in the block index update bitmap.

With reference to the second possible implementation manner of the second aspect, in a third possible implementation manner of the second aspect, the first filtering module includes:

a first process allocating unit, configured to allocate one or more GPU processes for each query condition; and a first filtering unit, configured to start the one or more GPU processes corresponding to each query condition to filter the block index in the global memory of the GPU, to obtain the first block index query result meeting the query condition, where the first block index query result includes a result obtained after the GPU process corresponding to each query condition filters the block index in the global memory of the GPU to obtain a block index filter array corresponding to each query condition, and a logical operation is performed on the block index filter array according to a logical relationship between the query conditions.

With reference to the third possible implementation manner of the second aspect, in a fourth possible implementation manner of the second aspect, the first result determining module includes:

a first operation unit, configured to perform a logical operation on the first block index query result and a block index set in a memory of the computer system, to obtain a first final block index query result;

a first original data filtering unit, configured to filter the original data in the database by using the first final block index query result; and a first final query result determining unit, configured to obtain the final data query result by performing querying, according to the query condition, in original data obtained after the filtering.

With reference to the first possible implementation manner of the second aspect, in a fifth possible implementation manner of the second aspect, the third filtering module includes:

a second process allocating unit, configured to allocate one or more GPU processes for each query condition; and a second filtering unit, configured to start the one or more GPU processes corresponding to each query condition to filter the block index in the asynchronous state in the global memory of the GPU, to obtain the third block index query result meeting the query condition, where the third block index query result includes a running result, which is copied from the global memory of the GPU, of the GPU process corresponding to each query condition, where the running result includes a result obtained after the GPU process corresponding to each query condition filters the block index in the asynchronous state in the global memory of the GPU to obtain a block index filter array corresponding to each query condition, and a logical operation is performed on the block index filter array according to a logical relationship between the query conditions.

With reference to the fifth possible implementation manner of the second aspect, in a sixth possible implementation manner of the second aspect, the second result determining module includes:

a second operation unit, configured to perform a logical operation on the third block index query result and the block index set in the memory of the computer system, to obtain a third final block index query result;

a third operation unit, configured to perform a logical operation on the second block index query result and the third final block index query result to obtain a second final block index query result;

a second original data filtering unit, configured to filter the original data in the database by using the second final block index query result; and a second final result determining unit, configured to obtain the final data query result by performing querying, according to the query condition, in original data obtained after the filtering.

In the method for querying data disclosed in the embodiments of the present invention, a CPU pre-generates a block index set corresponding to data in a database, because a data volume of the block index set is less than both original data and partitioned data, the block index set can be completely copied and stored into a global memory of a GPU, and when each block index in the global memory of the GPU is in an asynchronous state, querying is performed by directly using a GPU process, thereby omitting a process of repeatedly copying partitioned data from a memory in the prior art, simplifying a query process, shortening query time, and improving query efficiency.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer and more comprehensible, the following describes the technical solutions provided in the present invention in further detail with reference to the accompanying drawings and embodiments. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
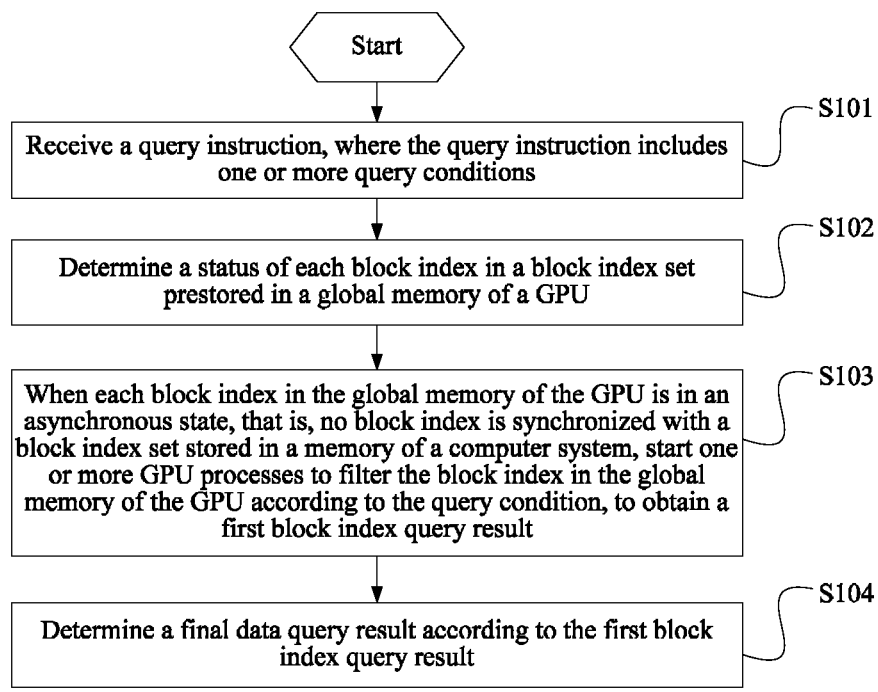
FIG. 1 is a flowchart of a method for querying data in a database according to an embodiment of the present invention.

An embodiment of the present invention provides a method for querying data in a database, where the database runs in a computer system including a central processing unit (Central Processing Unit, CPU) and a graphics processing unit (Graphics Processing Unit, GPU). A procedure of the method, as shown in FIG. 1, includes:

Step S101: Receive a query instruction, where the query instruction includes one or more query conditions.

The CPU receives the query instruction, where the instruction may include one query condition, for example, being greater than 5, or may simultaneously include multiple query conditions, for example, being greater than 5 and less than 100.

Step S102: Determine a status of each block index in a block index set prestored in a Global Memory (global memory, also referred to as a video memory) of the GPU, where the block index set includes at least one block index, and the block index set is generated by the CPU according to original data in a database and is stored into the global memory of the GPU.

A block index is used to indicate aggregate values (such as Min/Max/Sum/Count) of several rows of records (one logical block) in a column-store database; because the block index is used to pre-calculate and store aggregate values (a maximum value and a minimum value) of a group of data, in range query, the block index can be conveniently used to determine whether all, some, or none of the data meets a query condition, so as to facilitate further processing. Compared with a common index, the block index occupies only little space, but has high data filtering efficiency. Generally, at the beginning of a query process, a block index corresponding to data stored in a database needs to be created first. By using the column-store database as an example, the block index is often used to indicate the aggregate values (such as Min/Max/Sum/Count) of several rows of records (a logical block) in the database; assuming that the database includes 10 data columns, one block index may be generated for each data column, and a block index set including 10 block indexes corresponds to the whole database. Assuming that each data column includes 1000 rows of data, and a data column 1 includes 1000 rows of data, every 100 rows of data in the 1000 rows of data may correspond to one block index entry, a block index corresponding to each data column includes 10 block index entries, and a maximum value and a minimum value of the 100 rows of data corresponding to each block index entry are recorded in each block index entry.

Figure 2:
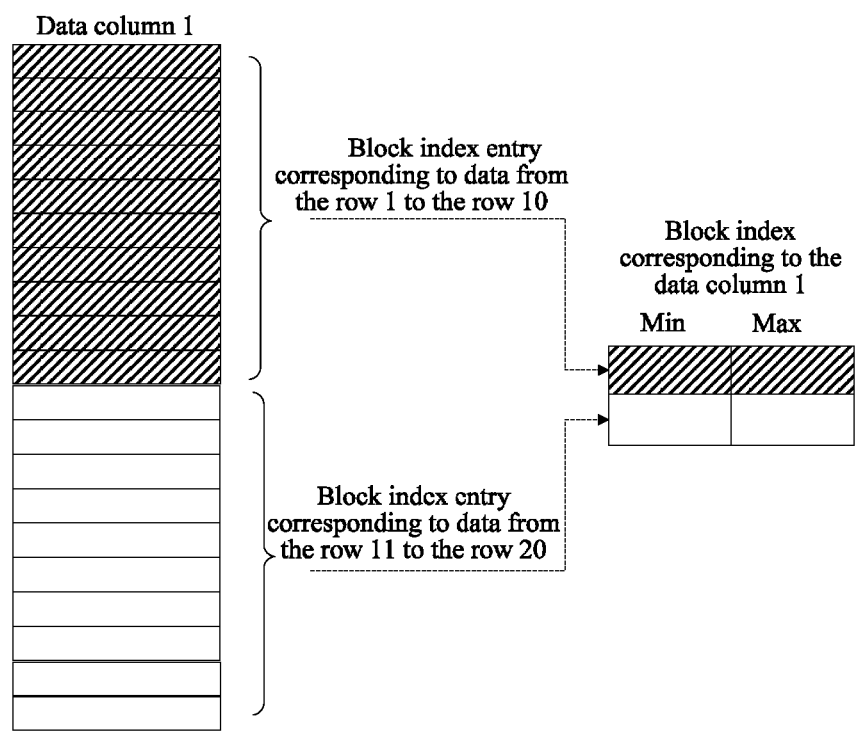
FIG. 2 is a schematic diagram of a data structure of a block index according to an embodiment of the present invention.

As shown in FIG. 2, assuming that a data column 1 includes 20 rows of data, and every 10 rows of data corresponds to one block index entry, the data column 1 corresponds to two block index entries, storage units filled with dashed lines are the former 10 rows of data, and blank storage units are the latter 10 rows of data, a block index entry corresponding to the former 10 rows of data is a block index entry filled with dashed lines, and a block index entry corresponding to the latter 10 rows of data is a blank block index entry. Each block index entry corresponds to 10 rows of data, and the two block index entries corresponding to the data column separately record, a maximum value and a minimum value of the former 10 rows of data and a maximum value and a minimum value of the latter 10 rows of data in the data column. The CPU generates a corresponding block index for each column of data in the database, and after making these block indexes form a block index set, copies and stores the block index set in the global memory of the GPU.

In the foregoing and following embodiments, a memory of the computer system also stores the block index set generated according to the original data in the database by the CPU; and a process of storing the block index set into the global memory of the GPU may be as follows:

dividing, into multiple logical pages according to the preset number of block index rows, the block index set that is generated by the CPU according to the original data in the database and is stored in the memory of the computer system; and copying the multiple logical pages and continuously storing the multiple logical pages into the global memory of the GPU.

Figure 3:
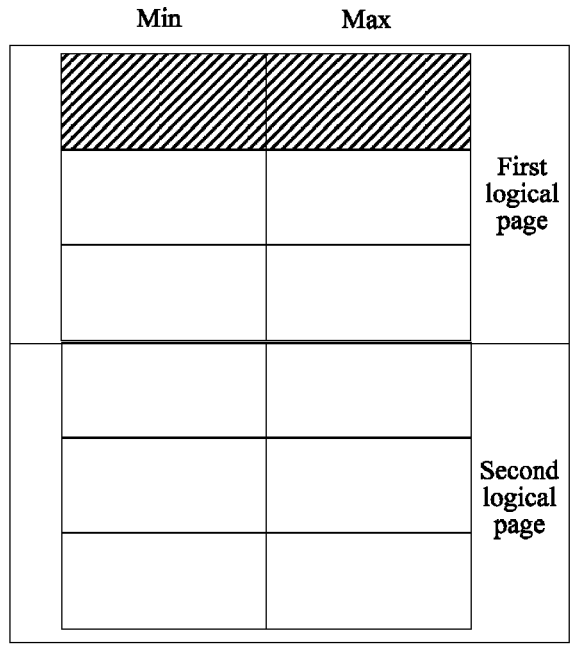
FIG. 3 is a schematic structural diagram of a logical page according to an embodiment of the present invention.

Assuming that every three rows of block indexes form one logical page, by using that the block index set stored in the memory of the computer system includes six rows of block indexes in total as an example, the block index set stored in the memory of the computer system is stored, as shown in FIG. 3, as two logical pages, that is, a first logical page and a second logical page, which are separately marked by using dashed lines in the figure, and then, the two logical pages are copied into the global memory of the GPU. Similarly, a block index stored in the memory of the computer system may also be stored in the foregoing manner.

By using the foregoing manner, the block indexes in the block index set corresponding to the database can be stored continuously, which reduces the number of times of data copying between the memory and the GPU when the block indexes are updated, and lowers usage of a processor.

After receiving the query instruction, the CPU analyzes the status of each block index. A specific process is: determining whether a block index stored in the global memory of the GPU is in a synchronous state at this moment, that is, determining whether a synchronization operation is being performed on the block index and a block index in the block index set stored in the memory of the computer system. The synchronization process is that, first, the original data stored in the database is updated, the block index set that corresponds to the original data and is stored in the memory is also updated; because the block index set stored in the global memory of the GPU is the same as the block index set stored in the memory, the block index set stored in the global memory of the GPU needs to be synchronized with an updated block index set stored in the memory, so that the two become the same. If the block index is in an asynchronous state, the block index can be queried, and if all block indexes are in an asynchronous state, step S103 may be performed.

Step S103: When each block index in the global memory of the GPU is in an asynchronous state, that is, no block index is synchronized with a block index set stored in a memory of the computer system, start one or more GPU processes to filter the block index in the global memory of the GPU according to the query condition, to obtain a first block index query result.

If there is one query condition, one GPU process may be started, or multiple GPU processes may be simultaneously started, and querying is simultaneously performed according to the query condition.

If there are multiple query conditions, in this case, serial querying may be performed by using the query conditions in a GPU process query manner in the prior art; first, one or more GPU processes are started to perform querying on one of the multiple query conditions, and after the querying is ended, a GPU process is started to perform querying on a next query condition; this procedure is repeated until querying is performed on all the query conditions.

When there are multiple query conditions, in addition to the foregoing procedure, because block indexes corresponding to the query conditions are all stored in the global memory of the GPU, parallel querying may further be performed according to the query conditions; one corresponding GPU process may be started for each query condition, or multiple GPU processes may be started for one or several query conditions, one GPU process is started for each of the other query conditions, and then these GPU processes are simultaneously used to perform querying, thereby implementing parallel querying according to multiple query conditions, and improving query efficiency.

Step S104: Determine a final data query result according to the first block index query result.

After the foregoing query process is ended, the first block index query result is obtained, and the first block index query result includes a block index meeting all query conditions. However, the first block index query result is not the final data query result, but is used to determine the final data query result. A block index includes data in a data column of the original data stored in the database, for example, the data column has 100 rows or 1000 rows. When the block index is used to perform querying, if a query condition is being greater than 50, and a maximum value of the 100 rows of data stored in the block index is 49, it may be determined that this block index does not meet the query condition. However, if a minimum value of the 100 rows of data stored in the block index is 40 and a maximum value of the 100 rows of data stored in the block index is 60, it is proved that the block index includes original data meeting the query condition, and the block index meets the query condition. Therefore, when a block index meeting all query conditions is obtained, original data meeting the query conditions further needs to be determined, by using these query conditions, from the multiple rows of data in the data column included in the block index, and the original data is the final query result.

In the method for querying data disclosed in this embodiment, a CPU pre-generates a block index set corresponding to data in a database, because a data volume of the block index set is less than both original data and partitioned data, the block index set can be completely copied and stored into a global memory of a GPU, and when each block index in the global memory of the GPU is in an asynchronous state, querying is performed by directly using a GPU process, thereby omitting a process of repeatedly copying partitioned data from a memory in the prior art, simplifying a query process, shortening query time, and improving query efficiency.

Figure 4:
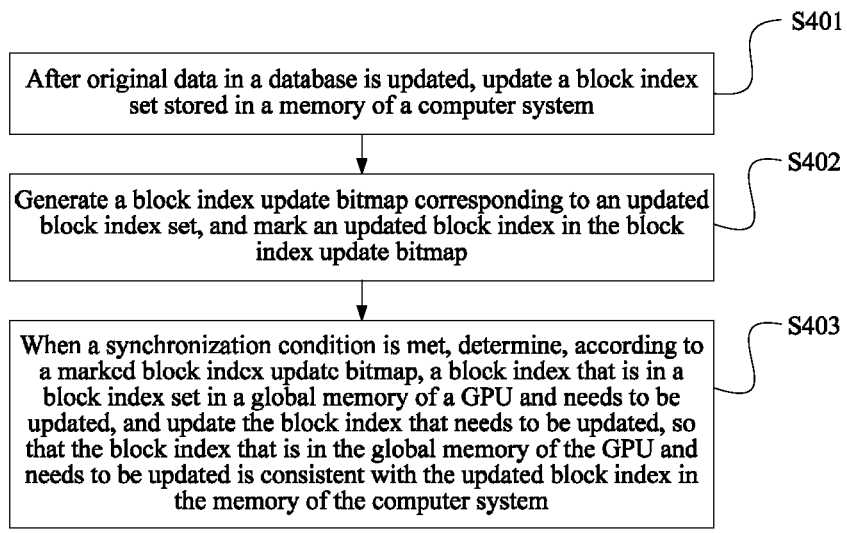
FIG. 4 is a flowchart of synchronizing a block index set in a global memory of a GPU with a block index set in a memory according to an embodiment of the present invention.

In the foregoing embodiment, synchronization of the block index set in the global memory of the GPU with the block index set in the memory is implemented by using the following steps, as shown in FIG. 4, which includes:

Step S401: After the original data in the database is updated, update the block index set stored in the memory of the computer system.

Step S402: Generate a block index update bitmap corresponding to an updated block index set, and mark an updated block index in the block index update bitmap.

When a data column in the database is updated, assuming that the data column has 1000 rows of data, and every 100 rows correspond to one block index entry, it is possible that a maximum value of one or several of 100 rows of data changes, or it is possible that a minimum value changes, or both a maximum value and a minimum value change; therefore, after updating, changes of a block index corresponding to one or several of 100 rows of data are manifested as changes of a maximum value and/or a minimum value, corresponding to the 100 rows of data, of the block index, that is, updating is performed.

Figure 5:
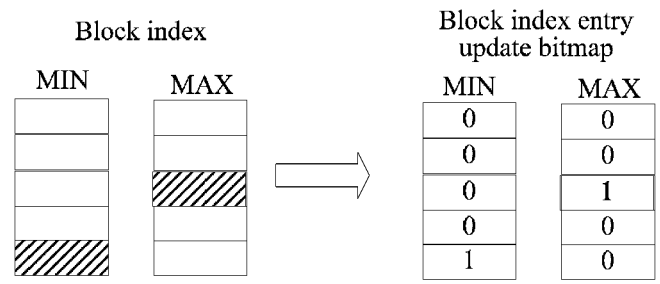
FIG. 5 is a schematic diagram of updating a block index set in a memory according to an embodiment of the present invention.

As shown in FIG. 5, a block index entry obtained after a block index in the block index set in the memory of the computer system is updated is a block index entry filled with dashed lines in the figure, blank areas are block index entries that are not updated. In an update bitmap corresponding to the block index, locations corresponding to updated block index entries are filled with 1 for marking, and locations corresponding to the block index entries that are not updated are filled with 0 for marking. After marking is performed in such a manner, which block indexes are updated may be clearly learned, and the block indexes that are updated are marked at the same time.

Step S401 and step S402 are steps for ensuring consistency between the block index set in the memory of the computer system and data in the database. After the steps are performed, a subsequent step is performed only when a synchronization condition is met.

Step S403: When a synchronization condition is met, determine, according to a marked block index update bitmap, a block index that is in the block index set in the global memory of the GPU and needs to be updated, and update the block index that needs to be updated, so that the block index that is in the global memory of the GPU and needs to be updated is consistent with the updated block index in the memory of the computer system.

Figure 6:
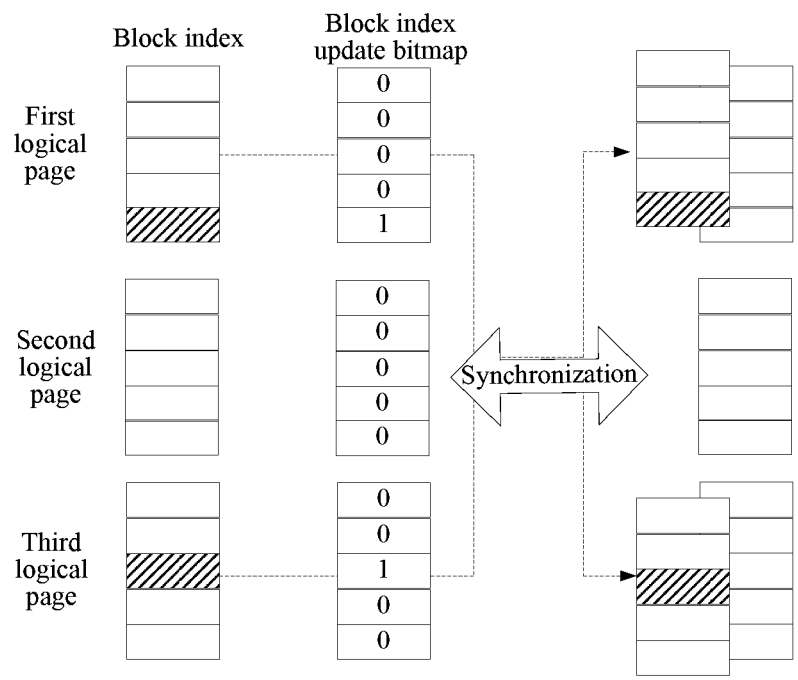
FIG. 6 is a schematic diagram of synchronizing a block index set in a global memory of a GPU with a block index set in a memory according to an embodiment of the present invention.

The synchronization process may be: separately synchronizing a block index entry, which needs to be updated, is in the block index needing to be updated, or may be: synchronizing a logical page on which the block index entry needing to be updated is located, that is, performing synchronization based on a page, as shown in FIG. 6. A block index is divided into three logical pages for storage, and when block index entries needing to be updated are on a first logical page and a third logical page, both the first logical page and the third logical page are synchronized.

In this process, synchronization is performed based on a logical page, and compared with synchronization performed based on a block index entry, the number of times of data copying between the memory of the computer system and the GPU is reduced, and synchronization efficiency is improved.

Meeting the synchronization condition may be that when the block index set in the memory of the computer system is updated, it is considered that the synchronization condition is met, or may be that a synchronization cycle is preset, for example, one week, or one day, and when a synchronization time point is reached, for example, 8 o'clock a.m. on Monday of each week, or 8 o'clock a.m. every day, it is considered that the synchronization condition is met.

In the foregoing process, a manner of marking, in the block index update bitmap, the block index entry in the updated block index set in the memory is used, so that an updated block index entry can be presented intuitively, which is convenient to synchronize the block index in the block index set in the global memory of the GPU.

An updated block index is presented in a bitmap manner or in a linked list manner, which is not limited in this embodiment.

Figure 7:
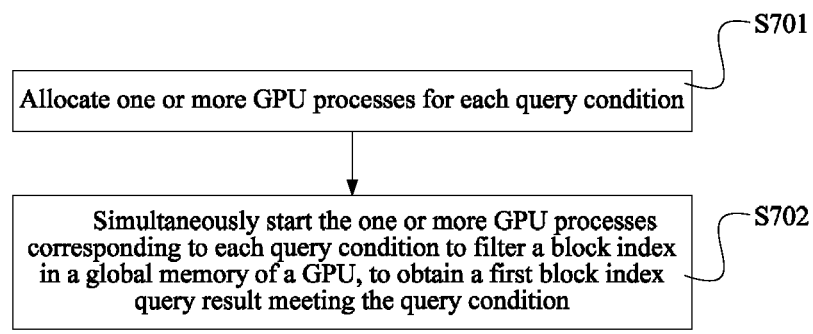
FIG. 7 is a flowchart of acquiring a first block index query result according to an embodiment of the present invention.

In the foregoing embodiment, a process of starting one or more GPU processes to filter the block index in the global memory of the GPU according to the query condition, to obtain a first block index query result, as shown in FIG. 7, includes:

Step S701: Allocate one or more GPU processes for each query condition.

Step S702: Simultaneously start the one or more GPU processes corresponding to each query condition to filter the block index in the global memory of the GPU, to obtain the first block index query result meeting the query condition.

Because the GPU process directly performs a filtering action, a process in which the CPU obtains the first block index query result meeting the query condition is:

copying, from the global memory of the GPU, a running result of the GPU process corresponding to each query condition, where the running result includes a result obtained after the GPU process corresponding to each query condition filters the block index in the global memory of the GPU to obtain a block index filter array corresponding to each query condition, and a logical operation is performed on the block index filter array according to a logical relationship between the query conditions.

After the GPU obtains a running result of the process, the CPU obtains the running result in a copying manner, and uses the running result as the first block index query result.

Specifically, because the first block index query result meeting the query condition is obtained instead of a real data query result, a final data query result needs to be determined by using the first block index query result. However, in the foregoing process, because updating of the database and synchronization of the block index set are not necessarily performed at the same moment, it is possible that when the block index set stored in the global memory of the GPU is queried, the block index set stored in the memory of the computer system is updated according to updating of the original data in the database. The process includes the following two cases according to whether the original data in the database is updated in the foregoing query process.

When data stored in the memory of the computer system is not updated, the method includes:

filtering the original data in the database by using the first block index query result; and obtaining the final data query result by performing querying, according to the query condition, in original data obtained after the filtering.

In the foregoing process, because the data in the memory of the computer system is not updated, the original data in the database may be filtered by directly using the first block index query result.

When data stored in the memory of the computer system is updated, the method includes:

performing a logical operation on the first block index query result and the block index set in the memory of the computer system, to obtain a first final block index query result;

filtering the original data in the database by using the first final block index query result; and obtaining the final data query result by performing querying, according to the query condition, in original data obtained after the filtering.

The foregoing process may also be implemented by using a block index update bitmap, which specifically is:

performing a logical operation on the first block index query result and the block index update bitmap in the memory, to obtain the first final block index query result;

filtering the original data in the database by using the first final block index query result; and obtaining the final data query result by performing querying, according to the query condition, in the original data obtained after the filtering.

In the foregoing process, because the data in the memory of the computer system is updated, updated original data needs to be filtered by using the first final block index query result, so as to ensure accuracy of a filtering result.

The foregoing embodiment describes the data query process in detail in a case in which each block index in the block index set in the global memory of the GPU is in the asynchronous state; however, in an actual query process, a block index being synchronized often exists in the block index in the block index set in the global memory of the GPU, that is, a case in which a block index in a synchronous state is included; in this case, even though a specific query idea of the data query process in a case in which the block index in the synchronous state is included is consistent with that in the foregoing embodiment, in a specific implementation process, some steps in some embodiments may be different, which is described in detail in the following.

Figure 8:
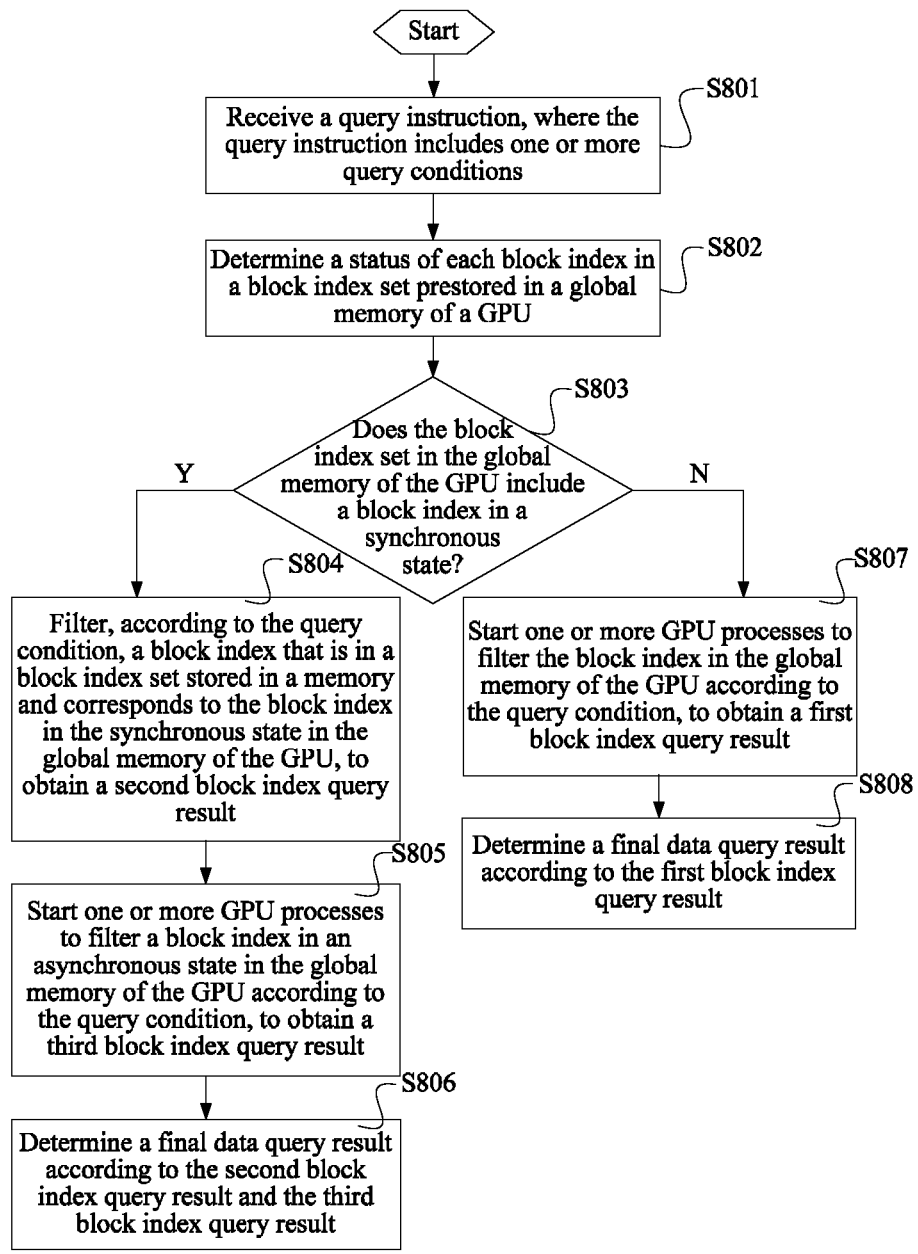
FIG. 8 is a flowchart of a method for querying data according to an embodiment of the present invention.

Another method for querying data disclosed in an embodiment of the present invention is shown in FIG. 8, and a specific process includes:

Step S801: Receive a query instruction, where the query instruction includes one or more query conditions.

Step S802: Determine a status of each block index in a block index set prestored in a global memory of a GPU.

Step S803: Determine whether the block index set in the global memory of the GPU includes a block index in a synchronous state, if the block index set in the global memory of the GPU includes the block index in the synchronous state, perform step S804, and if the block index set in the global memory of the GPU does not include the block index in the synchronous state, perform step S807.

Step S804: Filter, according to the query condition, a block index that is in a block index set stored in a memory and corresponds to the block index in the synchronous state in the global memory of the GPU, to obtain a second block index query result.

Because the block index set in the global memory of the GPU is generated by a CPU according to original data in a database and is stored in the global memory of the GPU, and the memory also stores the block index set generated according to the original data in the database by the CPU, the two block index sets are exactly the same at an initial generating stage. Assuming that the block index set generated according to the original data in the database by the CPU includes five block indexes whose serial numbers are 1, 2, 3, 4, and 5, the block index set in the global memory of the GPU also includes five block indexes whose serial numbers are 1', 2', 3', 4', and 5', and 1 and 1' are exactly the same, 2 and 2' are exactly the same, and so on. When data corresponding to a block index is updated, the block index also changes, for example, if a block index whose serial number is 1 changes, 1', as a block index corresponding to the block index whose serial number is 1, also needs to be synchronized with 1 to implement data update.

In this process, if the block index 1' in the block indexes in the global memory of the GPU is in a synchronous state, that is, the CPU performs a synchronization operation on the block index set stored in the global memory of the GPU with the block index set in the memory. In this case, because multiple threads of the GPU process need to execute same code, read and write operations cannot be simultaneously performed on a same block index, that is, the block index 1', and concurrent processing of a synchronization operation and a query operation cannot be implemented.

If the synchronization process is terminated, all block indexes are queried by directly using GPU data, which may cause an incorrect query result. For example, a maximum value of original data corresponding to the block index 1' is 10, and after updating, the maximum value changes to 5, if the block index 1' has not been synchronized yet, the maximum value of the data corresponding to the block index 1' is still 10, and if the query condition is being greater than 5, in this case, it is considered that the block index meets the query condition, which is obviously contrary to an actual situation.

To avoid the foregoing problem, in this embodiment, for the block index 1' being synchronized, the block index that is in the block index set stored in the memory and corresponds to the block index in the synchronous state is directly queried, that is, the block index whose serial number is 1 in the memory is directly filtered, and the block index is a synchronized block index, which can ensure accuracy of a query result.

Step S805: Start one or more GPU processes to filter a block index in an asynchronous state in the global memory of the GPU according to the query condition, to obtain a third block index query result.

This step and step S804 may be performed simultaneously, or may be performed successively. In addition, when this step and step S804 are performed simultaneously, query time is shortened to some extent.

Step S806: Determine a final data query result according to the second block index query result and the third block index query result.

Step S807: Start one or more GPU processes to filter the block index in the global memory of the GPU according to the query condition, to obtain a first block index query result.

Step S808: Determine a final data query result according to the first block index query result.

In the method for querying data disclosed in this embodiment, when there is a block index in a synchronous state in a block index set in a global memory of a GPU, a manner of querying a block index in a memory corresponding to the block index to obtain a second block index query result is used, so that a case in which an incorrect query result is obtained by performing querying according to a block index before synchronization is avoided, thereby improving accuracy of a query process.

In this embodiment, a process of synchronizing the block index set in the global memory of the GPU with a block index set in the memory may also be implemented by using steps shown in FIG. 4.

Figure 9:
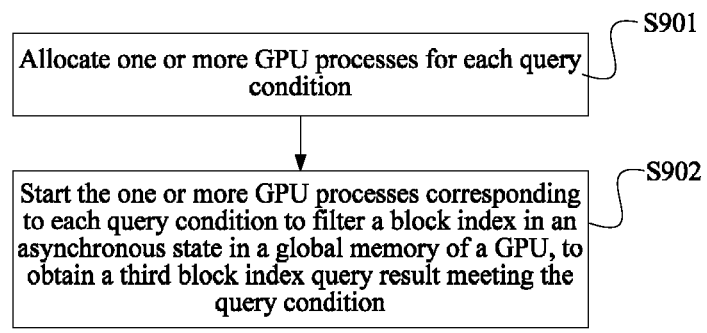
FIG. 9 is a flowchart of acquiring a third block index query result according to an embodiment of the present invention.

In the foregoing embodiment, a process of starting one or more GPU processes to filter a block index in an asynchronous state in the global memory of the GPU according to the query condition, to obtain a third block index query result, as shown in FIG. 9, includes:

Step S901: Allocate one or more GPU processes for each query condition.

Step S902: Start the one or more GPU processes corresponding to each query condition to filter the block index in the asynchronous state in the global memory of the GPU, to obtain the third block index query result meeting the query condition.

Because the GPU process directly performs a filtering action, a process in which the CPU obtains the first block index query result meeting the query condition is:

copying, from the global memory of the GPU, a running result of the GPU process corresponding to each query condition, where the running result of the GPU process includes a result obtained after the GPU process corresponding to each query condition filters the block index in the asynchronous state in the global memory of the GPU to obtain a block index filter array corresponding to each query condition, and a logical operation is performed on the block index filter array according to a logical relationship between the query conditions.

After the third block index query result is obtained, a process of determining the final data query result by using the second block index query result and the third block index query result also includes the following two cases according to whether the original data in the database is updated in the foregoing query process.

When data stored in the memory of the computer system is not updated, the method includes:

performing a logical operation on the second block index query result and the third block index query result to obtain a second final block index query result;

filtering the original data in the database by using the second final block index query result; and obtaining the final data query result by performing querying, according to the query condition, in original data obtained after the filtering.

When data stored in the memory of the computer system is updated, the method includes:

performing a logical operation on the third block index query result and the block index set in the memory of the computer system, to obtain a third final block index query result;

performing a logical operation on the second block index query result and the third final block index query result to obtain a second final block index query result;

filtering the original data in the database by using the second final block index query result; and obtaining the final data query result by performing querying, according to the query condition, in original data obtained after the filtering.

The foregoing process may also be implemented by using a block index update bitmap, which specifically is:

performing a logical operation on the third block index query result and the block index update bitmap in the memory, to obtain the third final block index query result;

performing a logical operation on the second block index query result and the third final block index query result to obtain the second final block index query result;

filtering the original data in the database by using the second final block index query result; and obtaining the final data query result by performing querying, according to the query condition, in the original data obtained after the filtering.

Figure 10:
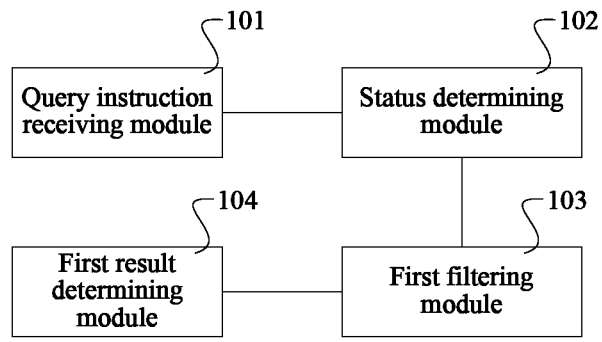
FIG. 10 is a schematic structural diagram of an apparatus for querying data according to an embodiment of the present invention.

An embodiment of the present invention also discloses an apparatus for querying data in a database corresponding to the method for querying data, where the database runs in a computer system including a central processing unit CPU and a graphics processing unit GPU, and a structure of the apparatus, as shown in FIG. 10, includes:

A query instruction receiving module 101 is configured to receive a query instruction, where the query instruction includes one or more query conditions.

This module receives the query instruction, where the instruction may include one query condition, for example, being greater than 5, or may simultaneously include multiple query conditions, for example, being greater than 5 and less than 100.

A status determining module 102 is configured to determine a status of each block index in a block index set prestored in a global memory of the GPU, where the block index set includes at least one block index, and the block index set is generated by the CPU according to original data in the database and is stored into the global memory of the GPU.

It is determined whether a block index stored in the global memory of the GPU is being synchronized at this moment. The synchronization process is that, first, the original data stored in the database is updated, a block index set that corresponds to the original data and is stored in a memory is also updated; because the block index set in the global memory of the GPU and the block index set in the memory are synchronous data, the block index set stored in the global memory of the GPU needs to be synchronized. If the block index is in an asynchronous state, the block index can be queried, and if all block indexes are in an asynchronous state, a GPU process may be started.

A first filtering module 103 is configured to: when each block index in the global memory of the GPU is in an asynchronous state, start one or more GPU processes to filter the block index in the global memory of the GPU according to the query condition, to obtain a first block index query result.

If there is one query condition, one GPU process may be started, or multiple GPU processes may be simultaneously started, and querying is simultaneously performed according to the query condition.

If there are multiple query conditions, in this case, serial querying may be performed according to the query conditions in a GPU process query manner in the prior art; first, one or more GPU processes are started to perform querying on one of the multiple query conditions, and after the querying is ended, a GPU process is started to perform querying on a next query condition; this procedure is repeated until querying is performed on all the query conditions.

When there are multiple query conditions, in addition to the foregoing procedure, because block indexes corresponding to the query condition are all stored in the global memory of the GPU, parallel querying may further be performed according to the query condition; one corresponding GPU process may be started for each query condition, or multiple GPU processes may be started for one or several query conditions, one GPU process is started for each of the other query conditions, and then these GPU processes are simultaneously used to perform querying, thereby implementing parallel querying according to multiple query conditions, and improving query efficiency.

A first result determining module 104 is configured to determine a final data query result according to the first block index query result.

After the foregoing query process is ended, the first block index query result is obtained, and the first block index query result includes a block index meeting all query conditions. However, the first block index query result is not the final data query result, but is used to determine the final data query result. A block index includes data, in a preset number of rows, of the original data stored in the database, for example, 100 rows or 1000 rows. When the block index is used to perform querying, if a query condition is being greater than 50, and a maximum value of the 100 rows of data stored in the block index is 49, it may be determined that this block index does not meet the query condition. However, if a minimum value of the 100 rows of data stored in the block index is 40 and a maximum value of the 100 rows of data stored in the block index is 60, it is proved that the block index includes original data meeting the query condition, and the block index meets the query condition. Therefore, when a block index meeting all the query conditions is obtained, original data meeting the query conditions further needs to be determined, by using these query conditions, from the multiple rows of data included in the block index, and the original data is the final query result.

In the apparatus for querying data disclosed in this embodiment, a CPU pre-generates a block index set corresponding to data in a database, because a data volume of the block index set is less than both original data and partitioned data, the block index set can be completely copied and stored into a global memory of a GPU, and when each block index in the global memory of the GPU is in an asynchronous state, querying is performed by directly using a GPU process, thereby omitting a process of repeatedly copying partitioned data from a memory in the prior art, simplifying a query process, shortening query time, and improving query efficiency.

The apparatus for querying data disclosed in the foregoing embodiment further includes:

an update module, configured to: after the original data in the database is updated, update the block index set stored in the memory; and a bitmap generating module, configured to generate a block index update bitmap corresponding to an updated block index set, and mark an updated block index in the block index update bitmap.

Further, the apparatus further includes:

a synchronization module, configured to determine, according to a marked block index update bitmap, a block index that is in the block index set stored in the global memory of the GPU and needs to be synchronized, and synchronize, with the updated block index set, the block index that needs to be synchronized.

By using the foregoing update module, bitmap generating module, and synchronization module, synchronization of a block index set in a global memory of a GPU with a block index set in a memory is implemented. In the foregoing apparatus, a manner of generating the block index update bitmap and marking the updated block index in the memory by the bitmap generating module is used, so that the updated block index can be presented intuitively, which is convenient for synchronization. The bitmap generating module is not necessarily used, or a manner of generating updated data into a linked list by a linked list generating module may be used, which is not limited in this embodiment.

Further, the first filtering module includes:

a first process allocating unit, configured to allocate one or more GPU processes for each query condition; and a first filtering unit, configured to start the one or more GPU processes corresponding to each query condition to filter the block index in the global memory of the GPU, to obtain the first block index query result meeting the query condition, where the first block index query result includes a result obtained after the GPU process corresponding to each query condition filters the block index in the global memory of the GPU to obtain a block index filter array corresponding to each query condition, and a logical operation is performed on the block index filter array according to a logical relationship between the query conditions.

In the foregoing process, because updating of the database and synchronization of the block index set are not necessarily performed at the same moment, it is possible that when block index data stored in the global memory of the GPU is queried, block index data stored in the memory is updated according to updating of the original data in the database. The first result determining module includes the following two cases according to whether the original data in the database is updated in the foregoing query process.

When data stored in the memory of the computer system is updated, the apparatus includes:

a first operation unit, configured to perform a logical operation on the first block index query result and the block index set in the memory of the computer system, to obtain a first final block index query result;

a first original data filtering unit, configured to filter the original data in the database by using the first final block index query result; and a first final query result determining unit, configured to obtain the final data query result by performing querying, according to the query condition, in original data obtained after the filtering.

When the data in the memory of the computer system is not updated, the first result determining module may not include the first operation unit, or may include the first operation unit, but does not enable the first operation unit to work. For working processes of other functional modules, reference may be made to the foregoing method embodiments.

Figure 11:
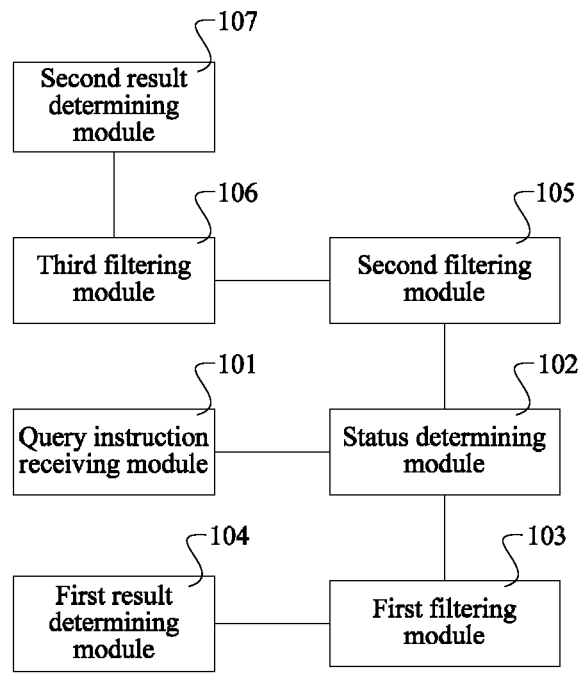
FIG. 11 is a schematic structural diagram of an apparatus for querying data according to an embodiment of the present invention.

The foregoing embodiment describes the data query process in detail in a case in which each block index in the global memory of the GPU is in the asynchronous state; however, in an actual query process, a block index being synchronized often exists in the block index set in the global memory of the GPU; in this case, in addition to the structure shown in FIG. 10, an entire structure of the apparatus for querying data further includes other functional units for implementing query functions in this case, and a specific structure of the apparatus is shown in FIG. 11.

Functions of a query instruction receiving module 101, a status determining module 102, a first filtering module 103, and a first result determining module 104 are consistent with those in the embodiment shown in FIG. 10, which are not described herein again. Compared with FIG. 10, functional units added in this embodiment are:

a second filtering module 105, configured to filter, according to the query condition, a block index that is in the block index set stored in the memory and corresponds to a block index in a synchronous state in the global memory of the GPU, to obtain a second block index query result;

a third filtering module 106, configured to start one or more GPU processes to filter a block index in an asynchronous state in the global memory of the GPU according to the query condition, to obtain a third block index query result; and a second result determining module 107, configured to determine a final data query result according to the second block index query result and the third block index query result.

In the apparatus for querying data disclosed in this embodiment, in addition to including all advantages of the apparatus shown in FIG. 10, a case in which a block index in a synchronous state exists in a block index set in a global memory of a GPU is considered, a solution that for a block index being synchronized, a block index that is in a block index set stored in a memory and corresponds to the block index in the synchronous state is directly queried is disclosed, so as to ensure accuracy of a query result; in addition, a GPU is still used to query a block index in an asynchronous state in the block index set in the global memory of the GPU, so as to ensure an efficient processing manner in a process for querying this part of data, thereby avoiding a case in which an incorrect query result is obtained by querying according to a data column before synchronization, and improving accuracy of a query process.

In the foregoing embodiment, the third filtering module includes:

a second process allocating unit, configured to allocate one or more GPU processes for each query condition; and a second filtering unit, configured to start the one or more GPU processes corresponding to each query condition to filter the block index in the asynchronous state in the global memory of the GPU, to obtain the third block index query result meeting the query condition.

Similarly, the second result determining module in this embodiment includes the following two cases according to whether the original data in the database is updated in the foregoing query process.

When data in the memory of the computer system is updated, the second data query result determining module includes:

a second operation unit, configured to perform a logical operation on the third block index query result and the block index set in the memory of the computer system, to obtain a third final block index query result;

a third operation unit, configured to perform a logical operation on the second block index query result and the third final block index query result to obtain a second final block index query result;

a second original data filtering unit, configured to filter the original data in the database by using the second final block index query result; and a second final result determining unit, configured to obtain the final data query result by performing querying, according to the query condition, in original data obtained after the filtering.

When data in the memory of the computer system is not updated, the second result determining module may not include the second operation unit, or may include the second operation unit, but does not enable the second operation unit to work. For working processes of other functional modules, reference may be made to the foregoing method embodiments.

Figure 12:
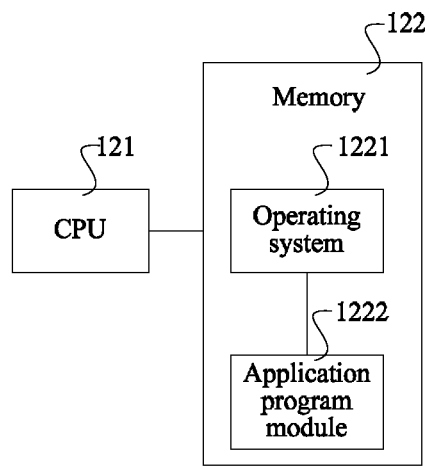
FIG. 12 is a schematic structural diagram of an apparatus for querying data according to an embodiment of the present invention.

A structure of another apparatus for querying data provided in the present invention is shown in FIG. 12, and the apparatus includes at least one CPU 121 and at least one memory 122.

The memory 122 may include a high-speed RAM memory, and may further include a non-volatile memory (non-volatile memory), such as at least one magnetic disk memory. The memory 122 may optionally include at least one storage apparatus located away from the foregoing CPU 121.

In some implementation manners, the memory 122 stores the following elements, an executable module or a data structure, or a subset thereof, or an extended set thereof:

an operating system 1221, including various system programs and configured to implement various basic services and process a hardware-based task; and an application program module 1222, including various application programs and configured to implement various application services.

The application program module 1222 includes, but is not limited to, a query instruction receiving module, a status determining module, a first filtering module, and a first result determining module. For specific implementation of the modules, refer to corresponding modules in the embodiments shown in FIG. 10 and FIG. 11, which are not described herein again.

In this embodiment of the present invention, a program or an instruction stored in the memory 122 is invoked, the CPU 121 is configured to receive a query instruction, where the query instruction includes one or more query conditions; determine a status of each block index in a block index set prestored in a global memory of a GPU, where the block index set includes at least one block index, and the block index set is generated by a CPU according to original data in a database and is stored into the global memory of the GPU; when each block index in the global memory of the GPU is in an asynchronous state, start one or more GPU processes to filter the block index in the global memory of the GPU according to the query condition, to obtain a first block index query result; and determine a final data query result according to the first block index query result.

In the foregoing embodiments, further, a memory of a computer system stores the block index set generated according to the original data in the database by the CPU, and the CPU 121 is further configured to:

when the block index set in the global memory of the GPU includes a block index in a synchronous state, filter, according to the query condition, a block index that is in the block index set stored in the memory and corresponds to the block index in the synchronous state in the global memory of the GPU, to obtain a second block index query result;

start one or more GPU processes to filter a block index in an asynchronous state in the global memory of the GPU according to the query condition, to obtain a third block index query result; and determine a final data query result according to the second block index query result and the third block index query result.

Further, before determining one or more to-be-queried block indexes corresponding to the query condition, the CPU 121 is further configured to: divide, into multiple logical pages according to the preset number of block index rows, the block index set generated according to the original data in the database by the CPU, and copy the multiple logical pages and continuously store the multiple logical pages into the global memory of the GPU;

after the original data in the database is updated, update the block index set stored in the memory; and generate a block index update bitmap corresponding to an updated block index set, and mark an updated block index in the block index update bitmap; and determine, according to a marked block index update bitmap, a block index that is in the block index set stored in the global memory of the GPU and needs to be synchronized, and synchronize, with the updated block index set, the block index that needs to be synchronized.

Further, the CPU 121 is further configured to:

allocate one or more GPU processes for each query condition;

start the one or more GPU processes corresponding to each query condition to filter the block index in the global memory of the GPU, to obtain the first block index query result meeting the query condition;

perform a logical operation on the first block index query result and the block index set in the memory of the computer system, to obtain a first final block index query result;

filter the original data in the database by using the first final block index query result; and obtain the final data query result by performing querying, according to the query condition, in original data obtained after the filtering.

And, the CPU 121 is further configured to: allocate one or more GPU processes for each query condition;

start the one or more GPU processes corresponding to each query condition to filter the block index in the asynchronous state in the global memory of the GPU, to obtain the third block index query result meeting the query condition;

perform a logical operation on the third block index query result and the block index set in the memory of the computer system, to obtain a third final block index query result;

perform a logical operation on the second block index query result and the third final block index query result to obtain a second final block index query result;

filter the original data in the database by using the second final block index query result; and obtain the final data query result by performing querying, according to the query condition, in original data obtained after the filtering.

As can be seen, by using the foregoing solution, a process of repeatedly copying partitioned data from a memory is omitted, a query process is simplified, query time is shortened, and query efficiency is improved.

Figure 13:
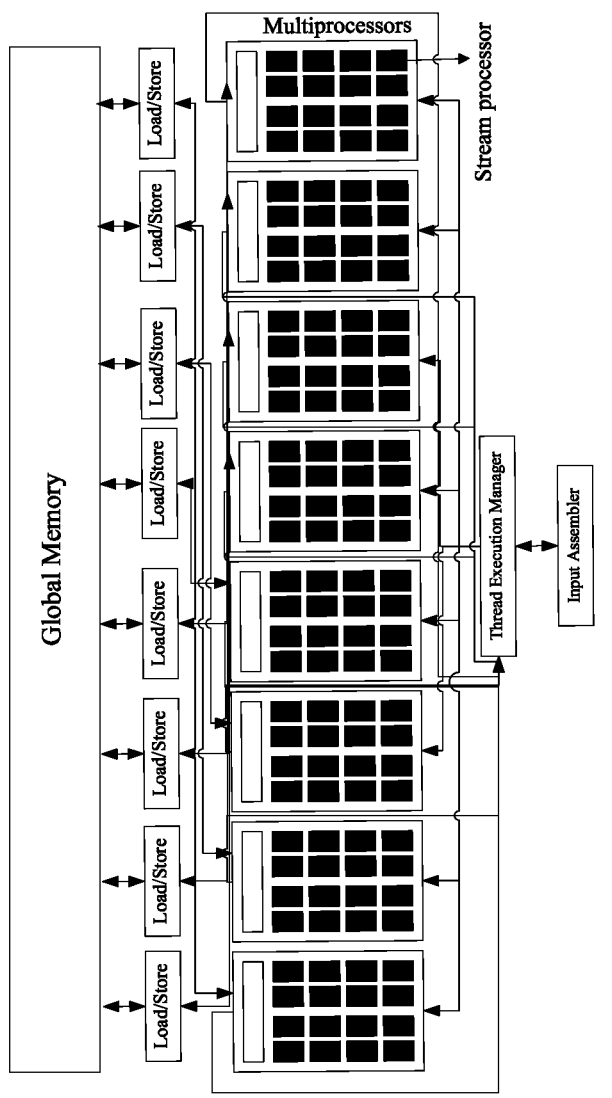
FIG. 13 is a schematic diagram of an architecture of a GPU according to an embodiment of the present invention.

FIG. 13 is a schematic diagram of an architecture of a GPU in a method for querying data according to the present invention. In this embodiment, a G80 architecture compliant GPU is used as an example; however, the present invention is not limited to the G80 architecture compliant GPU, and also supports a GPU in another architecture. The G80 architecture compliant GPU includes an input assembler (Input Assembler), a thread execution manager (Thread Execution Manager), a loader/storage, a global memory (Global Memory) of the GPU, and a group of shared multiprocessors (shared multiprocessor).

A typical G80 architecture compliant GPU has 128 stream processor units, where every 16 stream processor units form one group, and eight groups of shared multiprocessors are generated in total. Each stream processor unit has its own private memory, each group of shared multiprocessors has a shared memory, and all the shared multiprocessors share a global memory of the GPU.

Figure 14:
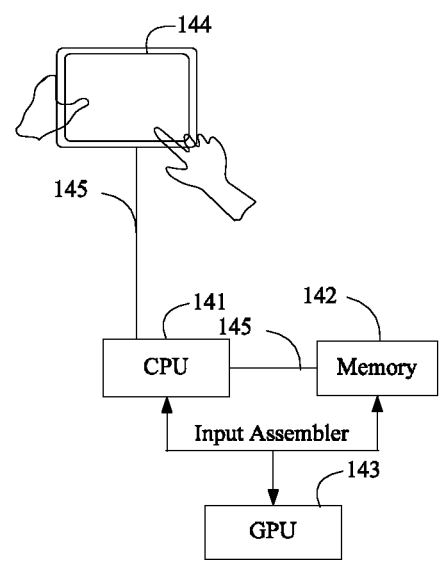
FIG. 14 is a schematic structural diagram of a computer system according to an embodiment of the present invention.

FIG. 14 is a schematic structural diagram of a computer system implementing a method for querying data according to the present invention. The computer system includes: a CPU 141, a memory 142, a GPU 143 shown in FIG. 13, and a user interface 144, where the user interface 144 includes a display, a keyboard, or a clicking device (for example, a mouse, a trackball (trackball), a touch board or a touch display screen), and in this embodiment, is a touch display screen, but is not limited to this specific implementation manner herein, and when the user interface 144 is a combination of a keyboard and a display, a function of the user interface 144 may also be implemented. The computer system further includes at least one communications bus 145, where the communications bus 145 is configured to implement connection and communication between these components.

The GPU 143 is connected to the CPU 141 and the memory 142 by using the input assembler.

A process in which the system implements the method for querying data in the present invention is as follows:

First, the CPU 141 generates a block index set corresponding to a database stored in the memory 142, and then stores the block index set into a global memory of the GPU 143 by using the input assembler.

After receiving a query instruction that is input through the user interface 144, the CPU 141 determines a status of each block index in the block index set stored in the global memory of the GPU, that is, determines whether each block index is in a synchronous state or in an asynchronous state; if each block index is in an asynchronous state, the CPU 141 sends an instruction to the GPU 143 by using the input assembler; starts one or more GPU processes, where a thread execution manager in the GPU executes these processes, to filter the block index in the global memory of the GPU according to a query condition, to obtain a first block index query result; and then determines a final data query result by using the first block index query result.

However, when the CPU 141 determines that there is a block index in a synchronous state in the block index set in the global memory of the GPU 143, the CPU 141 itself filters, according to the query condition, a block index that is in a block index set stored in the memory 142 and corresponds to the block index in the synchronous state in the global memory of the GPU, to obtain a second block index query result; at the same time, sends an instruction to the GPU by using the input assembler; starts one or more GPU processes, where the thread execution manager executes these processes, to filter the block index in the asynchronous state in the global memory of the GPU according to the query condition, to obtain a third block index query result; and determines a final data query result according to the second block index query result and the third block index query result.

Finally, the final data query result is displayed on the touch display screen.

If the functions of the method in the embodiment are implemented in the form of a software functional unit and sold or used as an independent product, the functions may be stored in a computing device-readable storage medium. Based on such an understanding, the part of the embodiments of the present invention contributing to the prior art or some of the technical solutions may be embodied in a form of a software product. The software product is stored in a storage medium, and includes several instructions for instructing a computing device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The embodiments in this specification are described in a progressive manner, each embodiment focuses on a difference from other embodiments, and for same or similar parts in the embodiments, reference may be made to these embodiments.

The foregoing descriptions for the disclosed embodiments enable a person skilled in the art to implement or use the present invention. Various modifications to the embodiments are obvious to a person skilled in the art, and general principles defined in this specification may be implemented in other embodiments without departing from the scope of the present invention. Therefore, the present invention is not limited to the embodiments described in this specification but extends to the widest scope that complies with the principles and novelty disclosed in this specification.

What is claimed is:

1. A method for querying data in a database for a computer system comprising the database, a central processing unit (CPU) and a graphics processing unit (GPU), comprising:
   generating, by the CPU, a block index set based on original data in the database and storing the block index set into a global memory of the GPU;
   receiving, by the CPU, a query instruction comprising one or more query conditions;
   determining, by the GPU, a status of each block index of the block index set stored in the global memory of the GPU, wherein determining the status of each block index comprises determining whether the block index is in a synchronous state or an asynchronous state; and
   starting, by the GPU in response to every block index in the global memory of the GPU being in an asynchronous state, one or more GPU processes to filter the block index set in the global memory of the GPU according to the one or more query conditions, to obtain a first block index query result for determining a data query result based on the first block index query result and one or more other block index query results.

2. The method according to claim 1, wherein the computer system further comprises a memory with the block index set generated by the CPU stored thereon, and the method further comprises:
   filtering, based on the block index set in the global memory of the GPU comprising a block index in a synchronous state, according to the one or more query conditions, a block index of the block index set stored in the memory that corresponds to the block index in the synchronous state in the global memory of the GPU, to obtain a second block index query result;
   wherein determining the data query result is further based on the second block index query result.

3. The method according to claim 1, wherein before determining the status of each block index in the block index set in the global memory of the GPU, the method further comprises:
   dividing the block index set generated by the CPU into multiple logical pages; and
   copying and storing the multiple logical pages into the global memory of the GPU.

4. The method according to claim 1, wherein the computer system further comprises a memory with the block index set generated by the CPU stored thereon, and wherein the method further comprises:
   based on the original data in the database being updated, updating the block index set stored in the memory; and
   generating a block index update bitmap corresponding to the updated block index set, and marking the updated block index in the block index update bitmap.

5. The method according to claim 4, further comprising:
   determining, according to the marked block index update bitmap, a block index of the block index set stored in the global memory of the GPU that needs to be updated, and updating the block index that needs to be updated.

6. The method according to claim 1, wherein starting the one or more GPU processes to obtain the first block index query result further comprises:
   allocating one or more GPU processes for each query condition of the one or more query conditions; and
   starting the one or more allocated GPU processes to obtain the first block index query result meeting the one or more query conditions;
   wherein obtaining the first block index query result meeting the one or more query conditions further comprises:
   copying, from the global memory of the GPU, a running result of the one or more started GPU processes, wherein the running result comprises a result obtained after the one or more started GPU processes filters the block index in the global memory of the GPU to obtain a block index filter array corresponding to each query condition, and a logical operation is performed on the block index filter array according to a logical relationship between query conditions.

7. The method according to claim 6, wherein determining the data query result further comprises:
performing a logical operation on the first block index query result and a block index set in a memory of the computer system;
filtering the original data in the database using a result of the logical operation; and
querying, according to the one or more query conditions, the filtered original data.

8. A computer system, comprising:
a database;
a central processing unit (CPU); and
a graphics processing unit (GPU);
wherein the CPU is configured to: generate a block index set based on original data in the database and store the block index set into a global memory of the GPU; and receive a query instruction comprising one or more query conditions;
wherein the GPU is configured to: determine a status of each block index of the block index set stored in the global memory of the GPU, wherein determining the status of each block index comprises determining whether the block index is in a synchronous state or an asynchronous state; and start, in response to every block index in the global memory of the GPU being in an asynchronous state, one or more GPU processes to filter the block index set in the global memory of the GPU according to the one or more query conditions, to obtain a first block index query result for determining a data query result based on the first block index query result and one or more other block index query results.

9. The computer system according to claim 8, further comprising:
a memory, configured to store the block index set;
wherein the GPU is further configured to filter, based on the block index set in the global memory of the GPU comprising a block index in a synchronous state, according to the one or more query conditions, a block index of the block index set stored in the memory that corresponds to the block index in the synchronous state in the global memory of the GPU, to obtain a second block index query result;
wherein determining the data query result is further based on the second block index query result.

10. The computer system according to claim 9, wherein the CPU is further configured to: divide the block index set into multiple logical pages; and copy and store the multiple logical pages into the global memory of the GPU.

11. The computer system according to claim 8, further comprising:
a memory, configured to store the block index set;
wherein the CPU is further configured to: based on the original data in the database being updated, update the block index set stored in the memory; and generate a block index update bitmap corresponding to the updated block index set, and mark the updated block index in the block index update bitmap.

12. The computer system according to claim 11, wherein the CPU is further configured to: determine, according to the marked block index update bitmap, a block index of the block index set stored in the global memory of the GPU that needs to be updated; and update the block index that needs to be updated.

13. The computer system according to claim 9, wherein starting the one or more GPU processes to obtain the first block index query result further comprises:
allocating one or more GPU processes for each query condition of the one or more query conditions; and
starting the one or more allocated GPU processes to obtain the first block index query result meeting the one or more query conditions;
wherein obtaining the first block index query result meeting the one or more query conditions further comprises:
copying, from the global memory of the GPU, a running result of the one or more started GPU processes, wherein the running result comprises a result obtained after the one or more started GPU processes filters the block index in the global memory of the GPU to obtain a block index filter array corresponding to each query condition, and a logical operation is performed on the block index filter array according to a logical relationship between query conditions.

14. The computer system according to claim 13, wherein determining the data query result further comprises:
performing a logical operation on the first block index query result and a block index set in a memory of the computer system;
filtering the original data in the database using a result of the logical operation; and
querying, according to the one or more query conditions, the filtered original data.

* * * * *